Sept. 12, 1939.     C. KELLER     2,172,910
POWER PLANT
Filed July 7, 1936     3 Sheets-Sheet 2
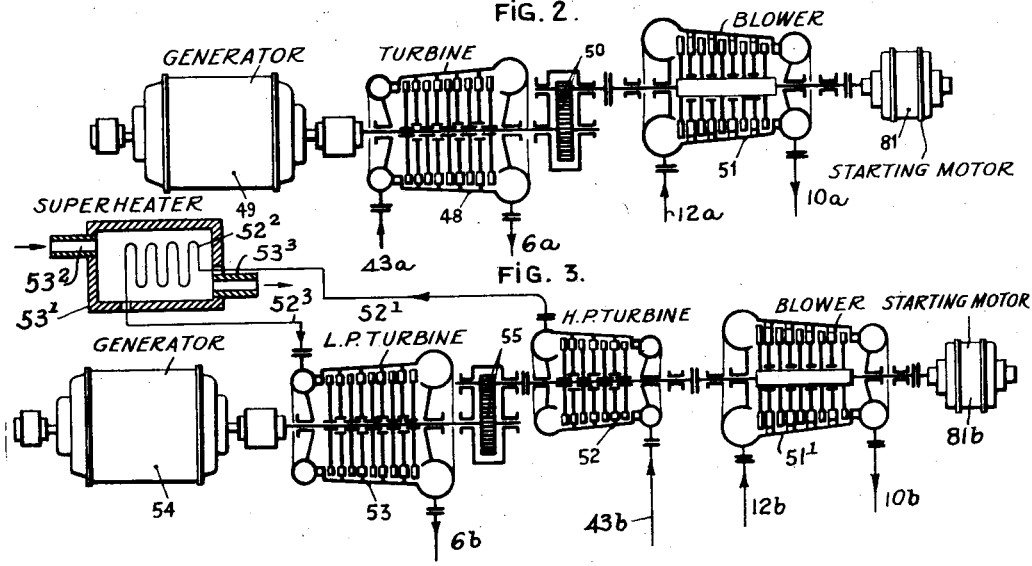
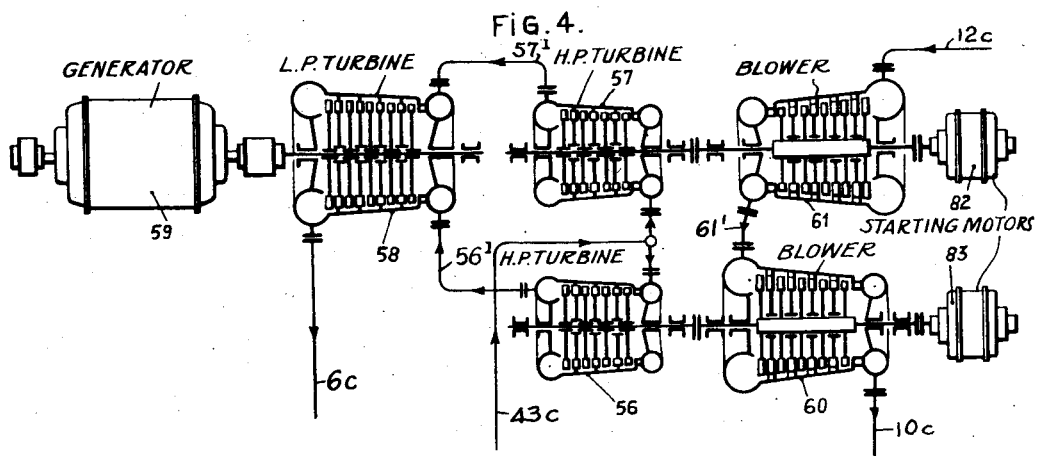
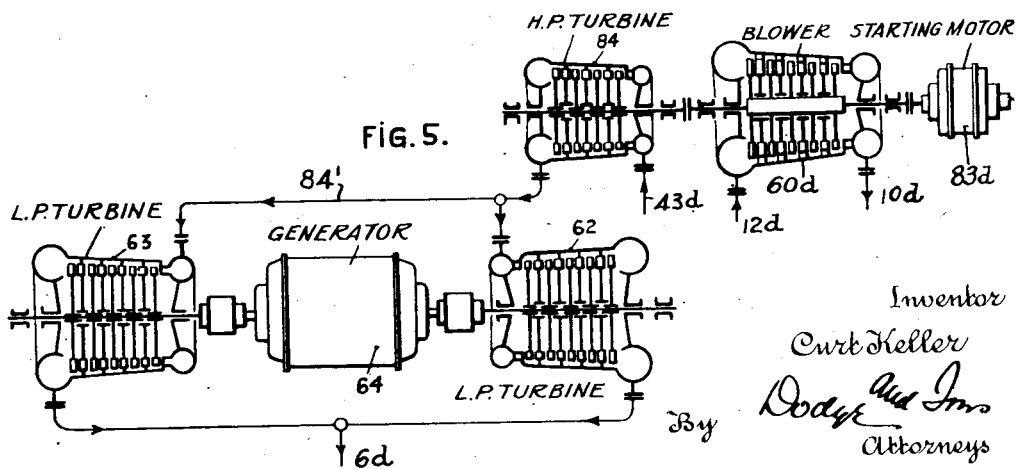
Inventor
Curt Keller
By Dodge and Sons
Attorneys Sept. 12, 1939.   C. KELLER   2,172,910
POWER PLANT
Filed July 7, 1936   3 Sheets-Sheet 3
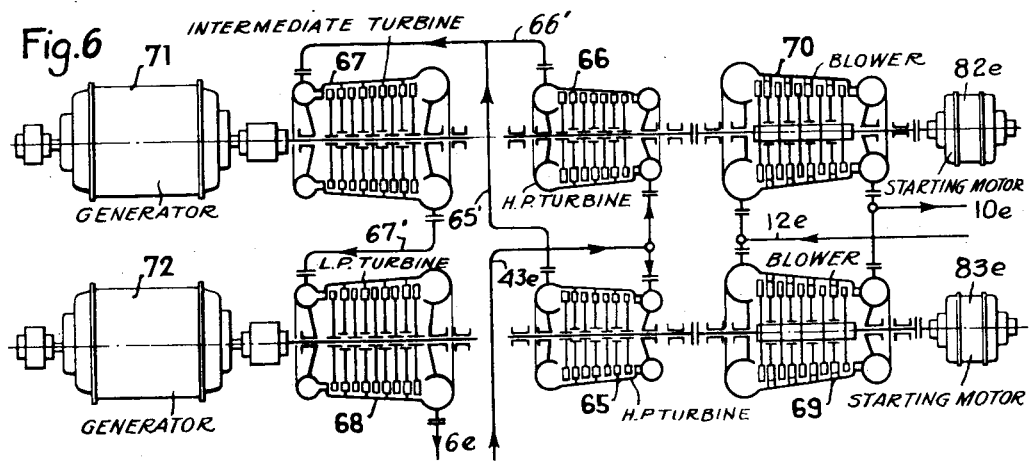
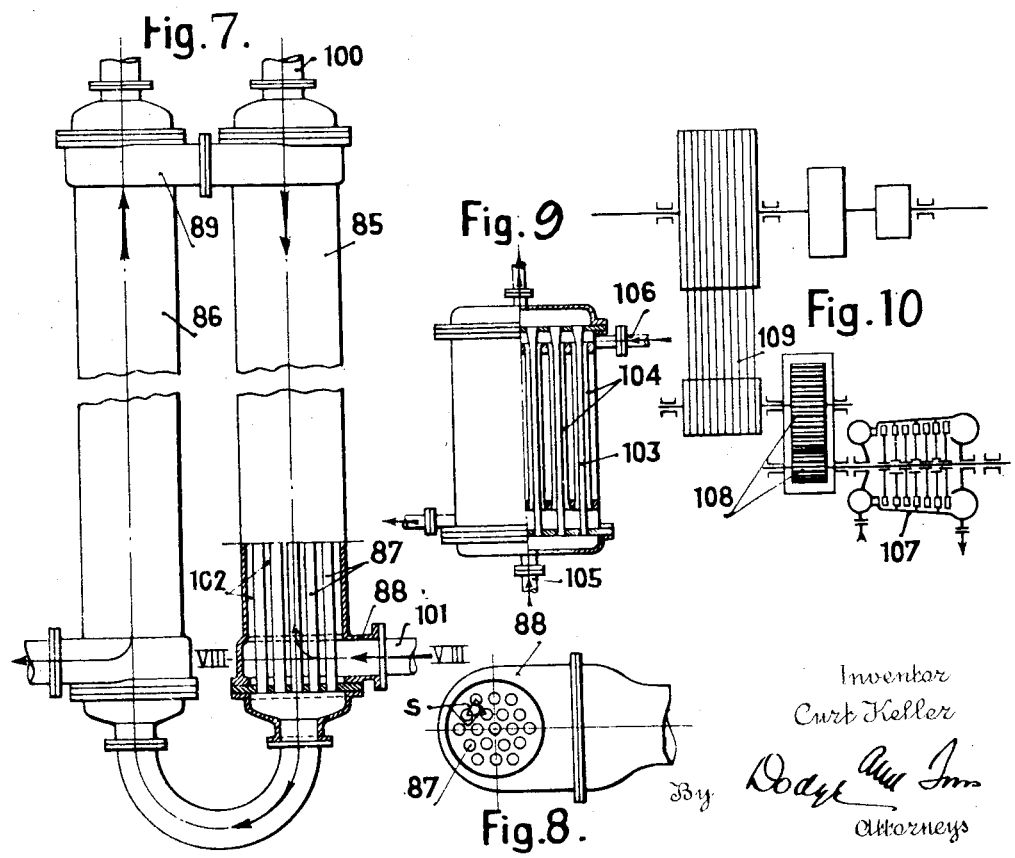
Inventor
Curt Keller
By Dodge
Attorneys Patented Sept. 12, 1939

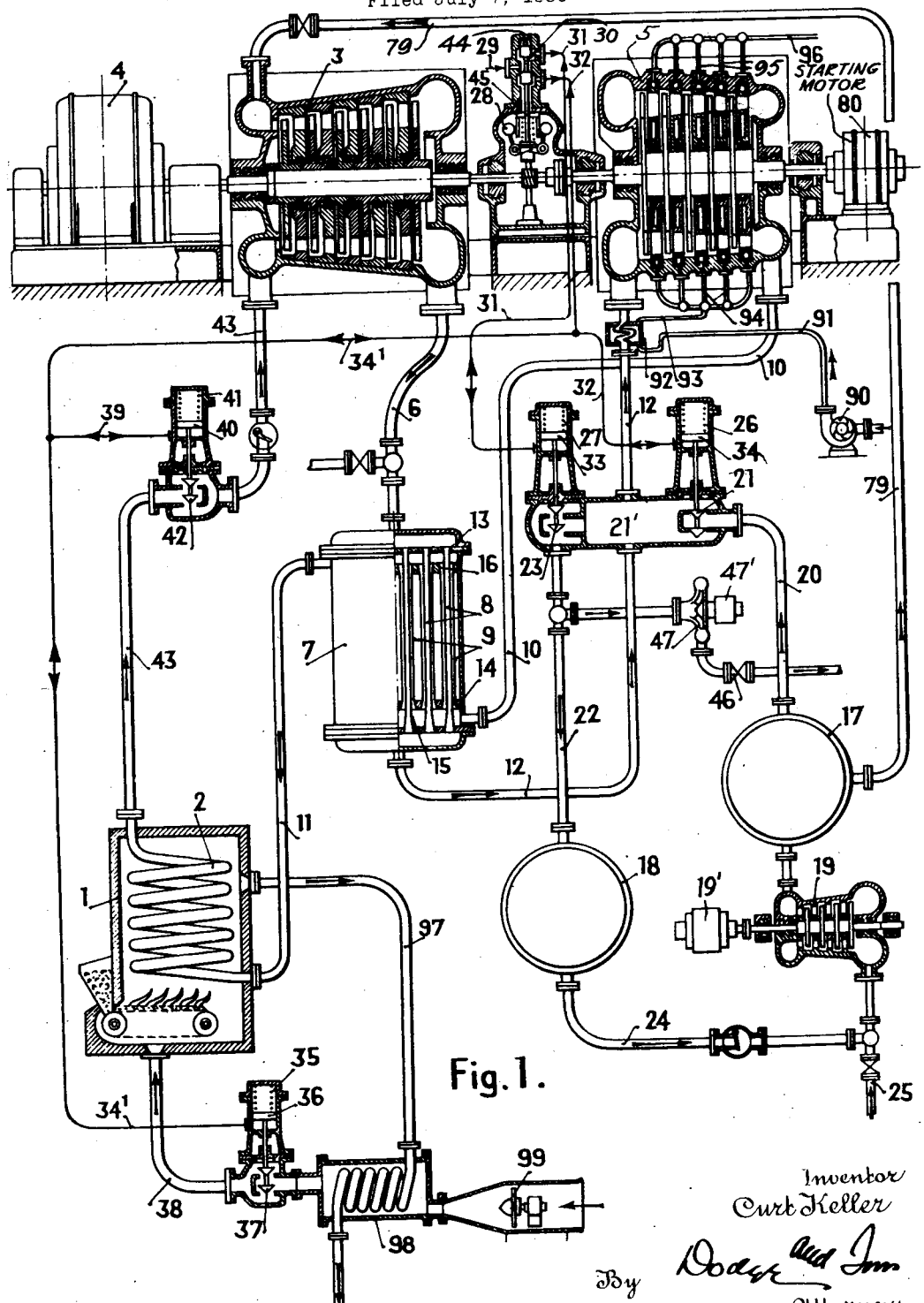

2,172,910

UNITED STATES PATENT OFFICE 2,172,910

POWER PLANT

Curt Keller, Zurich, Switzerland, assignor to Aktiengesellschaft für Technische Studien, Zurich, Switzerland, a corporation of Switzerland Application July 7, 1936, Serial No. 89,440
In Switzerland July 12, 1935

13 Claims. (Cl. 60—59)

The invention relates to a method for the working of thermal power plants, in which a gaseous working medium, preferably air, continuously describes a closed cycle under pressure above atmospheric, whereby the working medium, the temperature of which has been raised by a supply of heat from an outside source, is allowed to expand in at least one turbine while giving up energy externally, after which it is again brought to a higher pressure in at least one turbocompressor, an exchange of heat taking place between the expanded and the compressed current of working medium. The invention further relates to a plant for carrying out this method.

In spite of the fact that plants for carrying out this method have repeatedly been proposed and the most varying forms envisaged, such plants have not gained ground in practice up to the present. This is very largely due to a number of sources of loss, inherent to the respective methods and to the machines required for carrying out said methods, sources of loss which not only greatly reduce the thermo-dynamic efficiency, but also lead to certain parts having to be made of such large dimensions and therefore of such high initial cost, that no possibility existed of competing successfully with such plants against other power producing machines working in a more economical manner.

The object of the present invention is to eliminate simultaneously a number of co-related sources of loss, so as to provide a method of the kind hereinbefore referred to and also a plant for carrying it out, which, as regards thermo-dynamic efficiency, price, simplicity of operation and supervision, represent a great improvement as compared with the methods and plant hitherto known.

For this purpose it is one object of the present invention to improve the exchange of heat between the expanded and the compressed currents of working medium. Tests which have been carried out showed as a new fact that the losses in such heat exchangers—losses of pressure and temperature—are of paramount importance. As very considerable quantities of heat have to be exchanged in such apparatuses, whilst on the other hand excessively large surfaces are not desired, it is of great importance to suitably lay down the velocities and differences of temperature between the low pressure current of the working medium which has to be cooled down and the high pressure current of such medium which has to be heated up. An important feature of the invention is the practical application of the fact first discovered by applicant, that with a given heat exchange surface, determined by economic considerations, and with a given permissible temperature difference between the two currents of working medium which are exchanging heat while at different pressures, there is an optimum value for the ratio of mean velocities of the two currents, at which value the total loss of pressure in the exchanger is minimum. The invention contemplates the use of this optimum ratio. In consideration thereof the cross sections of flow in a heat exchanger according to the present invention, which can be designed as a tubular or plate apparatus of the countercurrent type are chosen in such a way that the expanded part of the working medium flows through the heat exchanger at a higher velocity than the re-compressed part of such working medium, whereby the pressure remains practically constant in both currents. On the lower pressure side the velocity of flow is accordingly higher, whilst it is lower on the higher pressure side. The conditions may be conveniently chosen in such a way that the velocities of the low pressure part of the working medium which has to be cooled and of the higher pressure part of such medium which has to be heated, are approximately inversely proportional to the roots of the absolute pressures of these parts. In case of need, this rule may be departed from more or less to simplify the design, provided a slight increase in the total loss of pressure appears admissible. Furthermore, care is taken that the absolute pressure on the high pressure side of the heat exchanger is at least twice as high as on the low pressure side, whereby the absolute pressure of the expanded part amounts to at least 2 kg./cm$^2$.

Another specific object of the invention is to ensure working conditions for the turbine and turbocompressor under which these machines can operate with practically constant efficiency at all prevailing loads of the plant, i. e., also at pronounced part loads and overloads. For this purpose according to the present invention the density of the circulating working medium is changed, whilst the speeds of the turbine and compressor are kept constant, approximately proportionally to the momentary power delivered externally by the turbine, whereby the pressures at the different points of the cycle vary in the same ratio, whilst the drops of heat and velocities of flow in the turbine and compressor remain practically constant. This method of regulation is particularly economical in the case of plants in which the working medium describes a closed cycle, as in such a case both the turbine or turbines as also the compressor or compressors will operate under all conditions of load always at the same working points, i. e., under the conditions for which the machines have been designed (same angle of blade, velocity diagrams, etc), so that the degree of efficiency, apart from small mechanical losses, remains practically unchanged down the smallest loads. The cross section conditions of the guide channels and the channels between the runner blades are correct for all working points, in contradistinction to the conditions in all known thermal power plants with steam or gas turbines. In a thermal power plant where the control of power is effected in this manner, means are also provided according to the present invention which permit of the automatic supply of working medium to the closed cycle and withdrawal of working medium from said cycle in dependence upon the momentary power given up externally.

Further, in order to ensure working conditions for the turbine or turbines and for the turbocompressors or compressor under which each of these different kinds of machines can operate under the most suitable working conditions for the attainment of high efficiencies, the compressor of a thermal power plant according to the present invention runs at a higher speed than the machine which has to deliver power to an external source. The turbine can conveniently be provided with two runners, the speeds of which are different, and one of which drives the turbocompressor, whilst the other delivers power to an external source. The turbine runners operating at a high pressure and high temperature can be run at higher speeds than the remaining runners and may be employed for driving the compressors.

By combining according to the present invention the different co-related measures referred to above, a result is ensured, which, as regards the conversion of heat into mechanical work and accordingly the economical operation of the plant, has never been attained to such a high degree. Where the conversion of heat into mechanical work is, at the present time, poor, as for instance in the case of vehicles, such as locomotives and aeroplanes, considerable improvement may be realized if only one or some of the measures according to the present invention be employed.

In the accompanying drawings are shown by way of example forms of plants for carrying out the new method, whereby it is assumed in all cases that air is employed as the working medium.

Fig. 1 shows a plant, in which an air turbine of the axial flow type both drives a compressor likewise of axial flow type, and a generator delivering energy to an outside source, all three machines having the same axis.

Fig. 2 shows an arrangement with an air turbine and an axial flow compressor, the axes of which are staggered, whereby the compressor operates at a higher speed than its driving turbine, the latter further driving a generator.

Fig. 3 shows an arrangement in which two turbine casings connected in series as to the flow of the working medium are provided, whereby the turbine runner working under high pressure and high temperature has a higher speed than the second turbine runner, said first mentioned runner also driving the compressor.

Fig. 4 shows an arrangement in which the high pressure section of the turbine is of multi-casing design, whereby these casings are connected in parallel as to the flow of the working medium.

Fig. 5 shows an arrangement in which the low pressure section of the turbine is of multi-casing design, the casings being connected in parallel as to the flow of the working medium.

Fig. 6 shows an arrangement in which the low pressure section of the turbine is of multi-casing design, the casings being connected in series, whilst the high pressure section is likewise of the two-casing type, but connected in parallel.

Fig. 7 is a front elevation partly in section of two heat exchangers connected in series.

Fig. 8 is a cross section on the line VIII—VIII of Fig. 7.

Fig. 9 shows a further modification of the heat exchanger.

Fig. 10 shows an air turbine delivering power externally through a belt drive.

In Fig. 1 reference 1 denotes a heater, in which heat is supplied to the air describing a closed cycle at a pressure above atmospheric. This heater 1 represents the point at which heat from an external source is introduced into the cycle. The actual heating of the air is effected in a surface heat exchanger 2, around which the combustion gases flow. The temperature may conveniently be brought up to at least 500° C. The air heated in this manner passes to a multi-stage air turbine 3 of the axial flow type in which it expands down to at least half the pressure which it had on entering the turbine 3, hereby giving up energy to a generator 4 and to a turbocompressor designed as a multi-stage axial flow blower 5. The air issuing from the turbine 3 having a pressure $p_n$ passes through piping 6 into a heat exchanger 7 designed as a counter current apparatus, in which it flows through a system of tubes 8, thereby giving up heat to that part of the working medium which flows at a pressure $p_h$ through a system of tubes 9. Each tube of the system 8 is surrounded by a tube of the system 9. This latter system is connected by a piping 10 to the axial blower 5 and by a piping 11 to the surface heat exchanger 2. The part of the working medium flowing through the tubular system 9 is of a higher pressure than the part passing through the tubular system 8. The expanded air cooled in the heat exchanger 7 down to at least 150° C. passes through a piping 12 into the turbocompressor 5, wherein it is re-compressed to a higher pressure whilst being cooled between the compressor stages. Hereafter the air is forced through the piping 10 into the heat exchanger 7.

The axial blower 5 and the air turbine 3 are designed in such a way and their speeds so chosen, that the air issuing from the air turbine 3 still has a pressure of at least 2 kg. $cm^2$. In the heat exchanger 7 the flow cross sections of the two tubular systems 8, 9, through which the two parts of the working medium flow and between which an exchange of heat has to take place in this heat exchanger 7, are so dimensioned that the part of the working medium issuing from the air turbine 3 passes through the heat exchanger 7 at a practically constant pressure and at a higher velocity than the high pressure part issuing from the axial blower 5.

The tubular systems 8, 9 of the heat exchanger 7 may further, in order to obtain satisfactory heat transmission coefficients, be conveniently so dimensioned that the velocity of the low pressure part of the working medium passing through the tubular system 8 and having to be cooled and the velocity of the high pressure part of such working medium passing through the tubular system 9 and having to be heated, are approximately inversely proportional to the roots of the absolute pressure of these currents of working medium. This condition is, for instance, fulfilled if the equation:

$$\frac{D_i^2 - d_a^2}{d_i^2} \sim \sqrt{\frac{p_n}{p_h}}$$

is satisfied. In this equation $D_i$ represents the internal diameter of the tubes 9, $d_a$ the external diameter and $d_i$ the internal diameter of the tubes 8, further $p_h$ the absolute pressure in the tubes 9 and $p_n$ the absolute pressure in the tubes 8. Furthermore, the inlets 13 and 14 respectively of the tubular systems 8, 9 may be rounded off and their outlets 15 and 16 may be made of diffusor shape, so that the flow losses, i. e., the pressure losses, are reduced to a minimum. The heat exchanger 7 may further be dimensioned in such a way that the difference in temperature between the two currents of the working medium having different absolute pressures ($p_h$ and $p_n$ respectively), is smaller than 70° C. at each point of the heat exchanger. Should the differences in temperature be greater, the loss would rapidly increase because too great a portion of the heat available in the low pressure part of the working medium is not transferred to that part of the working medium being heated, so that the thermal efficiency of the whole cycle would be low and consequently the method uneconomical.

For the whole closed working cycle not only the pressure losses, but also the temperature losses in the heat exchanger are important. These temperature losses are caused by the fact that between the current of working medium to be heated up and the current of such medium to be cooled down, a certain difference in temperature must exist and cannot be usefully employed in the cycle. One can provide for this difference in temperature to be small, but then the necessary surfaces of the heat exchanger become large with consequent increase of the pressure losses. With a large difference in temperature, the pressure losses diminish, but the temperature losses (thermodynamic losses) increase. For a given heat exchange surface, and in conjunction with the selected ratio of velocities of flow of the two currents of working medium in the exchanger, there is an optimum temperature difference at which the total losses in the exchanger (i. e., thermodynamic losses plus pressure losses) are minimum. As these total losses in the whole form the greater part of the losses in the whole working cycle, the reduction thereof to the greatest possible degree by the employment of economical means is very important. The difference $\delta T$ in temperature to be provided for between the current of working medium to be heated up and the current of such medium to be cooled down is, concomitant with the requirement that the velocities shall be inversely proportional to the roots of the corresponding pressures:

$$\delta T \sim 4 c_h \times \sqrt{\frac{k_2}{k_1}} \times \left(1 + \frac{p_h}{7 p_n}\right)$$

In this formula:

$\delta T$ = temperature difference between working medium to be heated and working medium to be cooled in the exchanger in degrees C.

$c_h$ = mean velocity in meters per second of the current whose pressure is $p_h$.

$$k_1 = \frac{1}{T_1 - T_2}$$

It will be understood that $T_1 - T_2$ represents the temperature drop through the turbine. (In case single intermediate superheating is used with a multi-casing turbine as hereinafter proposed with reference to Fig. 3, the value $2k_1$ should be substituted in the above formula for $k_1$.)

$$k_2 = \left(\frac{1}{\eta_0} - 1\right) \times \frac{\Delta T}{g \times R \times T_m \times \log_e\left(\frac{p_h}{p_n}\right)}$$

where:

$\eta_0$ = Thermic efficiency of the cyclic process, excluding losses in the heat exchanger.
$\Delta T$ = Cooling down and heating up in the heat exchanger.
$\log_e$ indicates Napierian logarithm.
$T_m$ = mean temperature of the heat exchanger.
$g$ = acceleration due to gravity = 9.81 m/sec².
$R$ = gas-constant (for air = 29.3).

By providing in the whole cyclic process a pressure above atmospheric, it is ensured that, even with low velocities in the heat exchangers 2, 7, the heat transmission coefficients will be good, which leads to small surfaces for the exchangers and therefore to small flow losses. The pressure ratio of the cycle, that is the ratio between the re-compressed and expanded part of the working medium, is not less than 2, as otherwise the heat drop available for the turbine would become too small, so that, for a given output, excessively large quantities of air would have to be circulated. Furthermore, the amounts of heat which have to be circulated in the heat exchanger 7 would then become so large, and accordingly also the dimensions of this device, that the percentage losses would likewise greatly increase and the plant become uneconomical.

90 indicates a cooling water pump which forces cooling water through a piping 91 into a heat exchanger 92, in which the air flowing to the compressor 5 is pre-cooled. This cooling water then flows from the heat exchanger 92 through a piping 93 into pipings 94, which are connected to different points of the casings of the turbo-compressor 5. The water heated in the compressor 5 is discharged through pipings 95, which are connected to a collecting piping 96.

The combustion gases leaving the heater 1 are still of high temperature. In order to further exploit the heat contained in such waste gas, the latter is supplied through a piping 97 to a heat exchanger 98, where it gives up heat to the air for combustion flowing to the heater 1 through piping 38. This air for combustion is forced by a blower 99 into the heat exchanger 98.

The regulation of governing of load fluctuations which arise in a plant of the kind described, is effected by changing the density of the working medium describing the closed cycle approximately proportionally to the momentary power given up externally by the turbine 3, the speeds of turbine 3 and compressor 5 being maintained unchanged. The temperature can hereby remain unchanged by controlling the fuel supplied to the heater 1. Accordingly, the pressure, i. e., the weight (in kg./sec.) of working medium flowing through the different points of the closed cycle is changed, the pressures at the different points of the cycle varying thereby approximately proportionally to the momentary power delivered externally by the turbine, whilst the heat drops and velocities of flow in the turbine 3 and compressor 5 remain practically unchanged. In order that such a method of regulation may be carried into effect, working medium is temporarily supplied to or withdrawn from the cycle. For this purpose reservoirs 17 and 18 are provided in the embodiment of the invention shown in Fig. 1. The reservoir 17 is connected to a compressor 19, which is driven by motor 19', and delivers air inhaled from the atmosphere into same; it is further connected by a piping 20 to an inlet valve 21. On the other hand the reservoir 18 is connected through a piping 22 to a discharge valve 23 and by means of a piping 24 to the suction piping 25 of the compressor 19. According to the adjustment of the valves 21, 23, the air flows either from the reservoir 17 into the closed cycle or from the latter into the reservoir 18. The adjustment of these valves 21, 23 which are urged in a closing direction by means of a spring 26 and 27 respectively, is effected automatically in dependence on the momentary power delivered externally by the turbine 3. This adjustment can conveniently be effected by means of an oil pressure control influenced by the governor 28 of the turbine 3, or by the governor of the machine 4 driven by the turbine 3. This oil pressure control comprises a piping 29 through which a liquid under pressure is supplied. It further comprises a distributing piston 30, which controls the connection of the piping 29 with two pipings 31, 32. The piping 31 is connected to the space below a piston 33 influenced by the spring 27, whilst the piping 32 is connected to the space below a piston 34 influenced by the spring 26. A piping 34¹ branches off from the piping 32 which former is connected to the space below a piston 36 influenced by a spring 35. This piston 36 controls the position of a valve 37, which is fitted in the piping 38, through which air for combustion is supplied to the heater 1. A piping 39 which also branches off from the piping 34¹, is connected to the space below a piston 40 influenced by a spring 41. This piston 40 controls the position of a throttle valve 42, fitted in the piping 43 connecting the heat exchanger 2 to the inlet of the turbine 3. 44 and 45 are outlets provided in the casing of the distributing piston 30 through which oil under pressure can flow out of the oil pressure control system.

The described means of regulation operate as follows:

If, for instance, the load on the generator 4 should fall, the air turbine 3 has the tendency to run faster. The governor 28 therefore raises the distributing piston 30 and oil under pressure can pass now from the piping 29 through the piping 31 to the lower side of the piston 33, so that valve 23 is lifted and working medium from the piping 12 of the closed cycle can flow via the valve 23 through the piping 22 into the reservoir 18. The pressure, and accordingly also the density of the air circulating in the closed cycle becomes smaller, i. e. the specific volume becomes greater, whereby the total volume flowing past a given point of the cycle in a given time remains the same. The weight of working medium (kg./sec.) flowing past a given point is accordingly smaller, so that also the output given up by the turbine 3 becomes smaller, this corresponding to the reduction in load which has occurred. The upward movement of the distributing piston 30 referred to, further allows oil under pressure to be discharged out of the oil pressure control system from the space below the piston 36 through the pipings 34¹, 32 and the port 45, as also from the space below the piston 40 through the pipings 39, 34¹, 32 and port 45. Accordingly, the valves 37 and 42 throttle the currents flowing through them to a slightly greater extent which must be the case, when the load on the generator 4 is reduced. On the other hand if the load on the generator 4 increases, the distributing piston 30 will be moved downwards in such a way that oil under pressure from the piping 29 can flow over to the piping 32, so that the valve 21 is opened and accordingly air is free to pass from the reservoir 17 into the closed cycle described by the working medium. The weight of such medium, flowing past a given point now becomes larger. At the same time valves 37 and 42 are also opened to a slightly greater extent, so that more air for combustion now flows to the heater 1 and the working medium flowing from the heat exchanger 2 to the turbine 3 is throttled to a lesser degree.

The purpose of the valve 42 is primarily to control fluctuations of load below full load. On the other hand the purpose of valve 37 is to provide for the working medium being heated in the surface heat exchanger 2 to a practically constant temperature, even under changed conditions of load.

The means which permit of working medium being automatically supplied to or withdrawn from the closed cycle in dependence on the momentary quantity of power given up to an external source, can in principle be arranged at any point of the cycle.

The pressure in the reservoir 17 which supplies additional working medium to the circuit on occurrence of a momentary increase of load, obviously must be higher than that prevailing in the chamber 21' (i. e., at the point in the closed cycle where the additional working medium is introduced). Similarly a lower pressure than that in chamber 21' must prevail in the reservoir 18 into which working medium must pass from the circuit on occurrence of a momentary decrease of load.

A valve 46 permits discharge of working medium from the circuit to the atmosphere, and if desired, an impeller 47 driven by a motor 47' may be provided to force working medium from the circuit to atmosphere when valve 46 is open.

Figures 2—6 show various arrangements of turbine and blower which may be substituted in the circuit illustrated in Fig. 1 in lieu of the turbine and blower there shown. In these figures the connections of the turbine and blower to the circuit, indicated in Fig. 1 at 6, 10, 12 and 43, are indicated in Figs. 2—6 by these same numerals distinguished by the letters a to e in successive figures, so that the relationship of the parts shown in Figs. 2—6 to the part of the circuit not illustrated in these figures may be readily understood.

Generally stated, the purpose of these views is to indicate the practicability of substituting multiple casing turbines and blowers connected in series and in parallel arrangements as to the flow of the medium. Figs. 2 and 3 illustrate gearing between different units turning at different angular speeds, while Figs. 4—6 omit such gearing. The purpose is to suggest the possibility of including or omitting this feature, without implying the necessity of adopting the particular arrangement of this detail shown in any particular figure.

By selection of units suited to particular conditions, the invention may be successfully applied under a wide range of load and other requirements, whereby such units can operate under working conditions at which high efficiencies are attainable.

Referring to Fig. 2, an axial flow air turbine 48 receives working medium through connection 43a and discharges through connection 6a. The turbine drives a generator 49 directly connected thereto, and drives a multi-stage axial flow blower 51 at higher angular speed through the gearing diagrammatically indicated at 50. The turbine 48 gives up energy externally through the generator 49. The motor 81 is used for starting up.

Referring to Fig. 3, 52 and 53 represent the two units of a two casing turbine. The runner of the high pressure unit 52 turns at a higher angular speed than the runner of the low pressure unit 53 with which it is connected by gearing 55. The low pressure runner is directly connected with generator 54 through which energy is given up externally. The high pressure runner is connected directly with the runner of the axial flow multi-stage blower 51'. Motor 81b is used for starting up.

Unit 52 receives working medium through connection 43b and discharges through connection 52', reheater coil $52^2$ and connection $52^3$ to inlet of unit 53 whose discharge connection appears at 6b. A shell 53' encloses reheater coil $52^2$ and causes heating medium from any source (not shown) entering at $53^2$ and discharging at $53^3$ to flow in heat transmitting contact with reheater coil $52^2$. This superheater is preferably operated so as to reheat the medium discharged from the turbine 52 to the temperature which it had prior to expansion through said turbine 52.

If this interstage reheating is not desired, the reheater may be omitted, in which case, connection 52' leads directly to $52^3$ as will be obvious.

The inlet and discharge connections of blower 51' are indicated at 12b and 10b.

The prime purpose of the gearing 55 is not the transmission of power, but is the positive maintenance of a balance between the outputs of turbines 52 and 53 such that each develops substantially at all times the output for which it was designed. The balancing power transmitted by the gear 55 is only a small fraction of the total power generated so that power losses in the gearing are small. The use of balancing gearing between units is not strictly essential, and the possibility of its omission is indicated in Figs. 4 to 6.

Figure 4 elaborates the idea of Fig. 3 somewhat. As in Fig. 3, a low pressure turbine drives the generator through which energy is given up externally, but there are two high pressure turbine units connected in parallel, and each of these drives a corresponding blower, the blowers being connected in series. No output balancing gearing is shown between the high pressure turbine units on the one hand and the low pressure unit on the other, for as suggested, none is strictly necessary.

Two high pressure tubine units 56 and 57 receive working medium through connection 43c and discharge through connections 56' and 57' to the inlet of low pressure turbine unit 58 whose discharge connection is shown at 6c. Turbine 58 drives the output generator 59 directly. Turbines 56 and 57 drive corresponding axial flow multi-stage blowers 60 and 61, each directly and independently. Motors for starting up are shown at 82 and 83.

Connection 12c supplies working medium to blower 61 from whose discharge it passes by connection 61' to the inlet of blower 60. The outlet of blower 60 leads to connection 10c.

In the embodiment of Fig. 5 a single high pressure unit drives a single blower unit, and delivers working medium in parallel to two low pressure turbine units which directly drive the output generator.

The high pressure axial flow turbine 84 is directly connected to multi-stage axial flow blower 60d. Two low pressure axial flow turbine units 62 and 63 are directly connected to the output generator 64. A motor for starting up is shown at 83d.

Turbine 84 receives working medium through connection 43d and discharges through connections 84' to the inlets of axial flow turbines 62 and 63 whose outlet connections lead to 6d.

Axial flow multi-stage blower 60d receives working medium through connection 12d and discharges it to connection 10d.

No output balancing gearing is shown between the high pressure unit 84 and the low pressure units 62, 63, since the use of balancing gearing is optional, as above explained.

Fig. 6 shows a further elaboration in which two high pressure turbine units are directly connected to respective blowers. The high pressure units are connected in parallel and deliver working medium to an intermediate pressure turbine which in turn delivers to a low pressure turbine unit.

Two high pressure axial flow turbine units 65, 66 drive respective multi-stage axial flow blower units 69, 70 directly. An intermediate turbine 67 of the axial flow type drives directly output generator 71, and a low pressure turbine 68, of the same type, drives directly output generator 72. Motors 82e and 83e are provided for starting up.

Blowers 69 and 70 receive working medium in parallel through connection 12e and discharge in parallel through 10e.

Turbines 65 and 66 receive working medium in parallel through 43e and discharge in parallel through 65' and 66' to the intake of intermediate turbine 67. This discharges through 67' to the intake of low pressure turbine 68, which in turn discharges through 6e.

In any case where the turbine is of multi-casing design, it is advantageous to couple those machines (blowers) which should be driven at high speed to that section or those sections of the turbine in which high temperatures and high pressures are dealt with, since in such case those turbine runners can be made of relatively small dimensions, owing to their high operating speed. Small diameters imply relatively low stresses which, in view of the high temperatures at which the runners must operate, offer a great advantage. Similarly, it is advantageous, because of the small specific volume of the air describing the closed cycle at a pressure above atmospheric, that both the turbine and compressor can be made of small dimensions, even though their outputs must be large.

Since increases in the upper temperature limit offer possible increases in the over all efficiency of the plant, future trends will be toward higher and higher temperatures. Hence, the considerations above outlined will increase in importance as increases in the upper temperature limit become practically possible.

The section of the turbine which has to give up energy to an external source can give up same directly instead of through a generator. Accordingly, in the case of the arrangement shown in Fig. 10, a turbine 107 operates a belt drive 109 through a transmission gear 108. Centrifugal compressors can, of course, also be provided, instead of axial compressors.

Instead of air, other gases, preferably those with high coefficients of heat transmission, such as, for instance, helium, hydrogen, nitrogen may, if necessary, be used as working media in a plant of the kind herein described.

As thermal power plants, in which the new method may be carried out, all kinds of stationary thermal power producing plants may be considered, also driving plants for aircraft, ships and locomotives.

To enable the plant being started up, means may be conveniently provided which permit of the necessary drop being produced in the turbine driving the compressor. The reservoir 17 (Fig. 1) may be considered as such a means; it is then to be connected directly through a piping 79 to the turbine 3.

As a further means for starting up an auxiliary set 80 (Fig. 1) can be provided, which can drive the compressor 5 to initiate the circulation of the working medium. Though an electric motor is illustrated and preferred, the specific form of the motor is immaterial.

The heat exchanger in which an exchange of heat has to take place between a part of the working medium under a higher pressure and a part of such medium under a lower pressure, can also be of multi-casing design, as shown in Fig. 7. The two casings 85, 86 of the exchanger shown in this Fig. 7 are, as regards the currents flowing through same, connected in series. In this case only one tubular system 87 is provided in each of the casings, one of the two currents of working medium between which the exchange of heat has to take place passing through said system, whilst the other current plays around the tubes 87. The necessary distribution of the latter current over the tubes 87 is ensured by suitably shaping the branches 88, 89. The part of the working medium issuing from the compressor is supplied through the piping 100, whilst the part issuing from the turbine flows through the piping 101. Accordingly, the pressure prevailing in the tubes 87 is higher than that in the space 102 through which these tubes 87 pass. With a design of this kind the desired ratio of velocity between the two currents of the working medium may be attained, when the distance $s$ between the centres of the cross section of adjacent tubes 87 is based on the finding of the following formula:

$$s \sim 0.95 \cdot D \sqrt{1 + \left(\frac{d}{D}\right)^2} \sqrt{\frac{p_h}{p_n}}$$

whereby $D$ denotes the external diameter and $d$ the internal diameter of the tubes 87, $p_h$ the pressure of the current having the higher pressure and $p_n$ the pressure of the current having the lower pressure.

In the case of a multi-casing design of the heat exchanger, as shown in Figs. 7 and 8, the various heat exchanger surfaces in the different casings may be made of materials suited to the prevailing temperatures. For instance, where lower temperatures prevail cheaper materials, for instance steel or copper, may be employed than for parts where higher temperatures occur. For the latter parts special steel alloys may be used.

Fig. 9 shows a heat exchanger in which working medium of a higher pressure flows through the internal tubular system 103, whilst working medium of a lower pressure passes through the external tubular system 104, the part of the working medium delivered by the compressor being supplied through the tubular system 105, whilst the part of the medium exhausted from the turbine passes through the tubular system 106.

What is claimed is:

1. Method for the working of thermal power plants, in which a gaseous working medium, preferably air, continuously describes a closed cycle under pressure above atmospheric, consisting in supplying heat to the working medium from an external source of heat, allowing the working medium thus heated up to expand while doing external work, compressing the expanded medium again to a higher pressure, effecting an interchange of heat between the expanded and the recompressed parts of the working medium before heat is supplied to the re-compressed part from said external source of heat, and in imparting to said two parts of the working medium having different pressures, velocities which are inversely proportional to the square roots of the absolute pressures of these parts.

2. Method for the working of thermal power plants, in which a gaseous working medium, preferably air, continuously describes a closed cycle under pressure above atmospheric, consisting in supplying heat to the working medium from an external source of heat, allowing the working medium thus heated up to expand while doing external work, compressing the expanded medium again to a higher pressure, effecting an interchange of heat between the expanded and the recompressed parts of the working medium before heat is supplied to the re-compressed part from said external source of heat, imparting to said two parts of the working medium having different pressures, velocities which are inversely proportional to the square roots of the absolute pressures of these parts, maintaining the pressure in each of said two heat interchanging parts of the working medium practically constant whilst the heat interchange is going on, and in keeping the difference of temperature between said two heat interchanging parts of the working medium at less than 70° C. at every point.

3. Method for the working of thermal power plants, in which a gaseous working medium, preferably air, continuously describes a closed cycle under pressure above atmospheric, consisting in supplying heat to the working medium from an external source of heat, allowing the working medium thus heated up to expand while doing external work, the pressure of this expanded part being kept above 2 kg. per sq. cm., compressing the expanded medium again to a pressure which is at least twice as high as that of said part of expanded medium, effecting an interchange of heat between the expanded and the re-compressed parts of the working medium before heat is supplied to the re-compressed part from said external source of heat, imparting to said two parts of the working medium having different pressures, velocities which are inversely proportional to the square roots of the absolute pressures of these parts, and in keeping the pressure in each of said two heat interchanging parts of the working medium practically constant whilst the heat interchange is going on.

4. Method for the working of thermal power plants, in which a gaseous working medium, preferably air, continuously describes a closed cycle under pressure above atmospheric, consisting in supplying heat to the working medium from an external source of heat, allowing the working medium thus heated up to expand in a turbine while doing external work, re-compressing the expanded medium in a turbo-compressor, effecting an interchange of heat between the expanded and the re-compressed parts of the working medium before heat is supplied to the re-compressed part from said external source of heat, and in varying the density of the working medium, whilst maintaining the temperatures at different points in the cycle substantially constant and whilst keeping constant the speeds of the turbine and compressor, approximately proportionally to the momentary power delivered externally by withdrawing from said cycle working medium or supplying such to said cycle, the pressures at the different points of the cycle varying thereby in the same ratio whilst the heat drops and the velocities of flow in the turbine and compressor remain practically constant.

5. Method for the working of thermal power plants, in which a gaseous working medium, preferably air, continuously describes a closed cycle under pressure above atmospheric, consisting in supplying heat to the working medium from an external combustion source of heat, allowing the working medium thus heated up to expand in a turbine while doing external work, re-compressing the expanded medium in a compressor, effecting an interchange of heat between the expanded and the re-compressed parts of the working medium before heat is supplied to the re-compressed part from said external source of heat, varying the density of the working medium whilst the speeds of the turbine and compressor are kept constant, approximately proportionally to the momentary power delivered externally by withdrawing from said cycle working medium or supplying such to said medium, and influencing simultaneously with the varying of the density of the working medium the amount of air for combustion supplied to said external source of heat, the pressures at the different points of the cycle varying thereby in the same ratio whilst the heat drops and the velocities of flow in the turbine and compressor remain practically constant.

6. Thermal power plant, in which a gaseous working medium, preferably air, continuously describes a closed cycle under pressure above atmospheric, comprising an external source of heat in which heat is supplied to the working medium, a turbine in which the working medium thus heated up is allowed to expand whilst the turbine delivers power externally, a compressor driven by said turbine for compressing the expanded medium again to a higher pressure, and a heat exchanger comprising two tubular systems, in which the expanded part of the working medium issuing from the turbine gives off heat to the re-compressed part of the working medium issuing from the compressor before heat is supplied to this re-compressed part by said external source, each tube of one of said systems being surrounded by a tube of the other system and the ratio of the transverse area of the passage between the outer and inner tubes, to the transverse area of the passage within the inner tubes being approximately equal to the square root of the ratio of the pressure prevailing between the tubes to the pressure prevailing within the inner tubes.

7. Thermal power plant, in which a gaseous working medium, preferably air, continuously describes a closed cycle under pressure above atmospheric, comprising an external source of heat in which heat is supplied to the working medium, a turbine in which the working medium thus heated up is allowed to expand whilst the turbine delivers power externally, a compressor driven by said turbine for compressing the expanded medium again to a higher pressure, and a heat exchanger comprising a tubular system to which is supplied the part of the working medium issuing from said compressor, whilst the part of the working medium issuing from the turbine is caused to play around said tubular system, the distance $s$ between the centres of the cross sections of adjacent tubes of said system being based on the finding of the formula:

$$s \sim 0.95 . D \sqrt{1 + \left(\frac{d}{D}\right)^2} \sqrt{\frac{p_h}{p_n}}$$

wherein $D$ denotes the external and $d$ the internal diameters of said tubes, $p_h$ the pressure of the re-compressed part of the working medium and $p_n$ the pressure of the expanded part of said medium.

8. Thermal power plant, in which a gaseous working medium, preferably air, continuously describes a closed cycle under pressure above atmospheric, comprising an external source of heat in which heat is supplied to the working medium, a turbine in which the working medium thus heated up is allowed to expand whilst the turbine delivers power externally, a turbo-compressor driven by said turbine for compressing the expanded medium again to a higher pressure, a heat exchanger in which the expanded part of the working medium issuing from the turbine gives off heat to the re-compressed part of the working medium issuing from the compressor before heat is supplied to this re-compressed part, and means influenced by the fluctuations in the output arising in the plant, said means adapting automatically the density of the working medium describing the closed cycle to the momentary output of the plant, and means responsive to fluctuations in the output for varying the amount of heat supplied by said external source of heat to the working medium so as to maintain the temperatures at different points of the cycle substantially constant.

9. Thermal power plant, in which a gaseous working medium, preferably air, continuously describes a closed cycle under pressure above atmospheric, comprising an external source of heat in which heat is supplied to the working medium, a turbine in which the working medium thus heated up is allowed to expand whilst the turbine delivers power externally, a turbo-compressor driven by said turbine for compressing the expanded medium again to a higher pressure, a heat exchanger in which the expanded part of the working medium issuing from the turbine gives off heat to the re-compressed part of the working medium issuing from the compressor before heat is supplied to this re-compressed part, governing means influenced by the fluctuations in the output arising in the plant, means for supplying working medium to the cycle on a momentary increase of load occurring, means for withdrawing working medium from the cycle on a momentary falling off of load occurring, and means influenced by said governing means for controlling the connection between the closed cycle and said means for supplying working medium to and said means for withdrawing such medium from the closed cycle, and means responsive to the load on the plant for varying the amount of heat supplied by said external source of heat to the working medium so as to maintain the temperatures at different points of the cycle substantially constant.

10. Thermal power plant, in which a gaseous working medium, preferably air, continuously describes a closed cycle under pressure above atmospheric, comprising an external combustion source of heat in which heat is supplied to the working medium, a turbine in which the working medium thus heated up is allowed to expand whilst the turbine delivers power externally, a compressor driven by said turbine for compressing the expanded medium again to a higher pressure, a heat exchanger in which the expanded part of the working medium issuing from the turbine gives off heat to the re-compressed part of the working medium issuing from the compressor before heat is supplied to this re-compressed part, governing means influenced by the fluctuations in the output arising in the plant, means for supplying working medium to the cycle on a momentary increase of load occurring, means for withdrawing working medium from the cycle on a momentary falling off of load occurring, means influenced by said governing means for controlling the connection between the closed cycle and said means for supplying working medium to and said means for withdrawing such medium from the closed cycle, means for influencing a combustion in said external source of heat, and means effecting an operative connection between said governing means and said means for influencing the combustion.

11. Thermal power plant, in which a gaseous working medium, preferably air, continuously describes a closed cycle under pressure above atmospheric, comprising an external source of heat in which heat is supplied to the working medium, a turbine in which the working medium thus heated is allowed to expand and comprising several rotors, the rotors dealing with the higher pressures and temperatures running at higher speeds than the remaining rotors, machines delivering power externally, compressors of the axial-flow type compressing the expanded working medium again to a higher pressure, the turbine rotors running at higher speeds driving said compressors and the turbine rotors running at a lower speed and arranged when seen in the direction of flow of the working medium, after the rotors running at a higher speed, driving said machines delivering power externally, and a heat exchanger in which the expanded part of the working medium issuing from the turbine gives off heat to the re-compressed part of the working medium issuing from the compressor before heat is supplied to this re-compressed part.

12. A step in the method of operating thermal power plants comprising the cyclic circulation of a fluid medium through an expansion engine, a compressor and a surface heat interchanger, and wherein heat is imparted in the interchanger from the expanded fluid discharging from the engine to the compressed fluid leaving the compressor, which consists in coordinating the pressures and the velocities of the fluid streams passing through the interchanger, in such relation that the velocities of said fluid streams vary substantially inversely to the square roots of the pressures under which the streams are flowing.

13. A method for the working of thermal power plants, in which a gaseous working medium, preferably air, continuously describes a closed cycle under pressure above atmospheric, consisting in supplying heat to the working medium from an external source of heat, allowing the working medium thus heated up to expand while doing external work, compressing the expanded medium again to a higher pressure, effecting an interchange of heat between the expanded and the recompressed parts of the working medium before heat is supplied to the re-compressed part from said external source of heat, imparting to said two parts of the working medium having different pressures, velocities which are inversely proportional to the square roots of the absolute pressures of these parts, and in keeping a difference of temperature between the two heat interchanging parts of the working medium adapted to satisfy approximately the following formula:

$$\delta T \sim 4 c_h \cdot \sqrt{\frac{k_2}{k_1}} \cdot \left(1 + \frac{1}{7} \cdot \frac{p_h}{p_n}\right)$$

CURT KELLER.